March 26, 1929.  M. REID  1,706,544
LATHE
Original Filed Oct. 20, 1919   6 Sheets-Sheet 2

Inventor,
M. Reid
By Hull, Smith, Brock &Was.
Attys.

March 26, 1929.  M. REID  1,706,544

LATHE

Original Filed Oct. 20, 1919  6 Sheets-Sheet 5

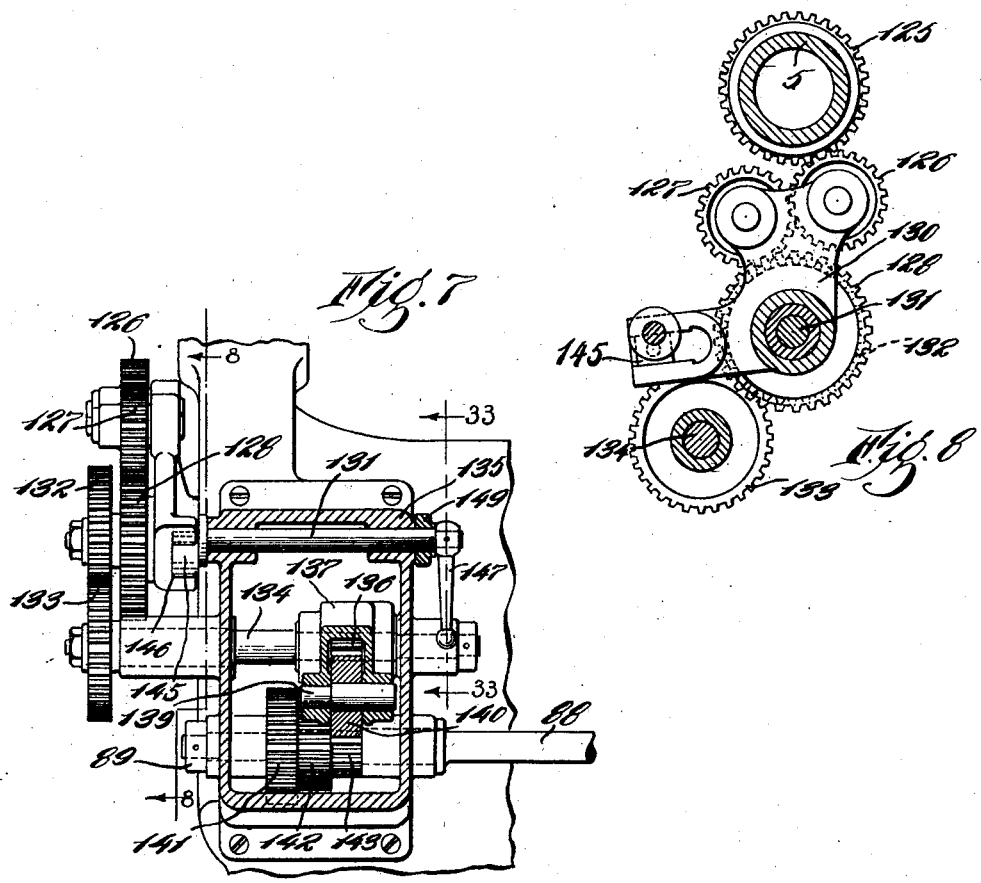

Patented Mar. 26, 1929.

1,706,544

UNITED STATES PATENT OFFICE.

MARCELLUS REID, OF CLEVELAND, OHIO.

LATHE.

Application filed October 20, 1919, Serial No. 332,109. Renewed December 24, 1927.

This invention relates to machines such as lathes and is directed more particularly to the carriage feed and stop mechanism therefor.

The primary object of the present invention is to provide a particularly accurate stop mechanism for a lathe carriage which shall serve to automatically stop the carriage feed mechanism at a predetermined point in either direction of travel of the carriage.

Another object is to provide a carriage feed mechanism of the aforesaid character which shall be simple in construction, accurate and reliable in operation and which may be easily adjusted.

A still further object is to provide means for varying the speed of travel of the carriage which may be easily and quickly adjusted, and also to provide means for manually operating the carriage.

With these and other objects in view the invention consists in the various novel features of construction and arrangement or combination, all of which will be fully described hereinafter and pointed out in the appended claims.

Figure 1:
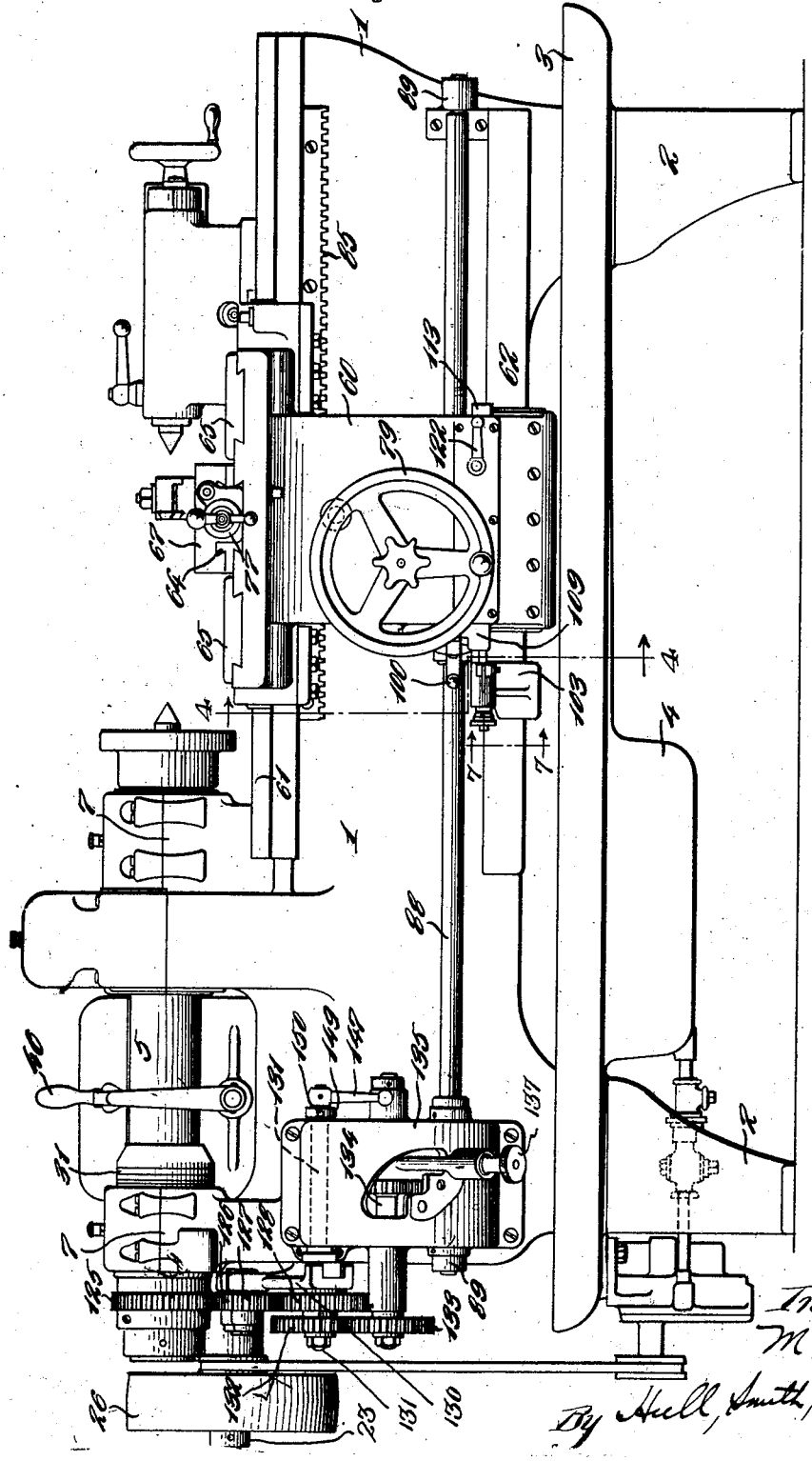
Figure 2:
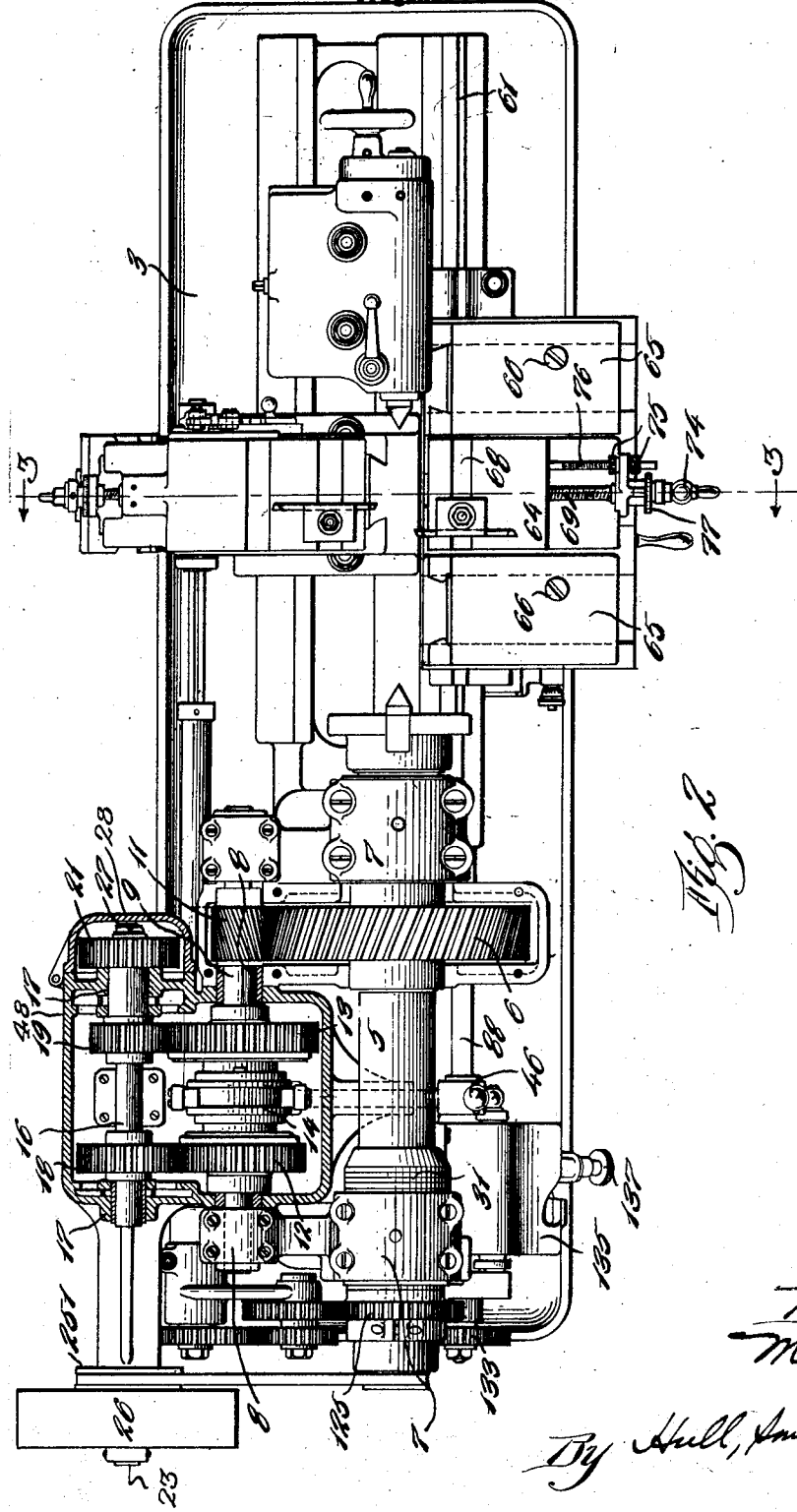
Figure 3:
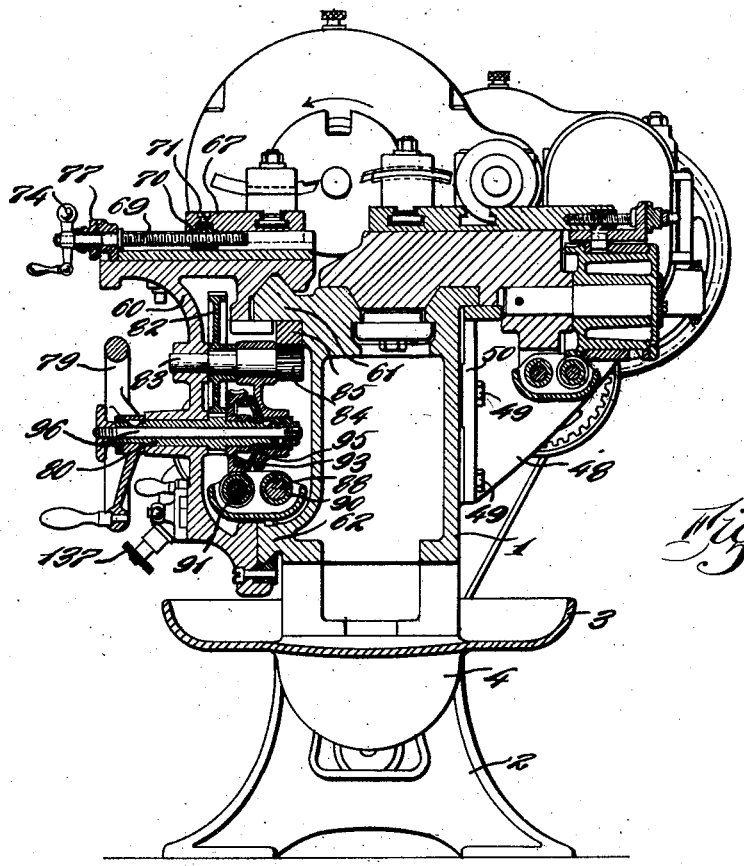
Figure 4:
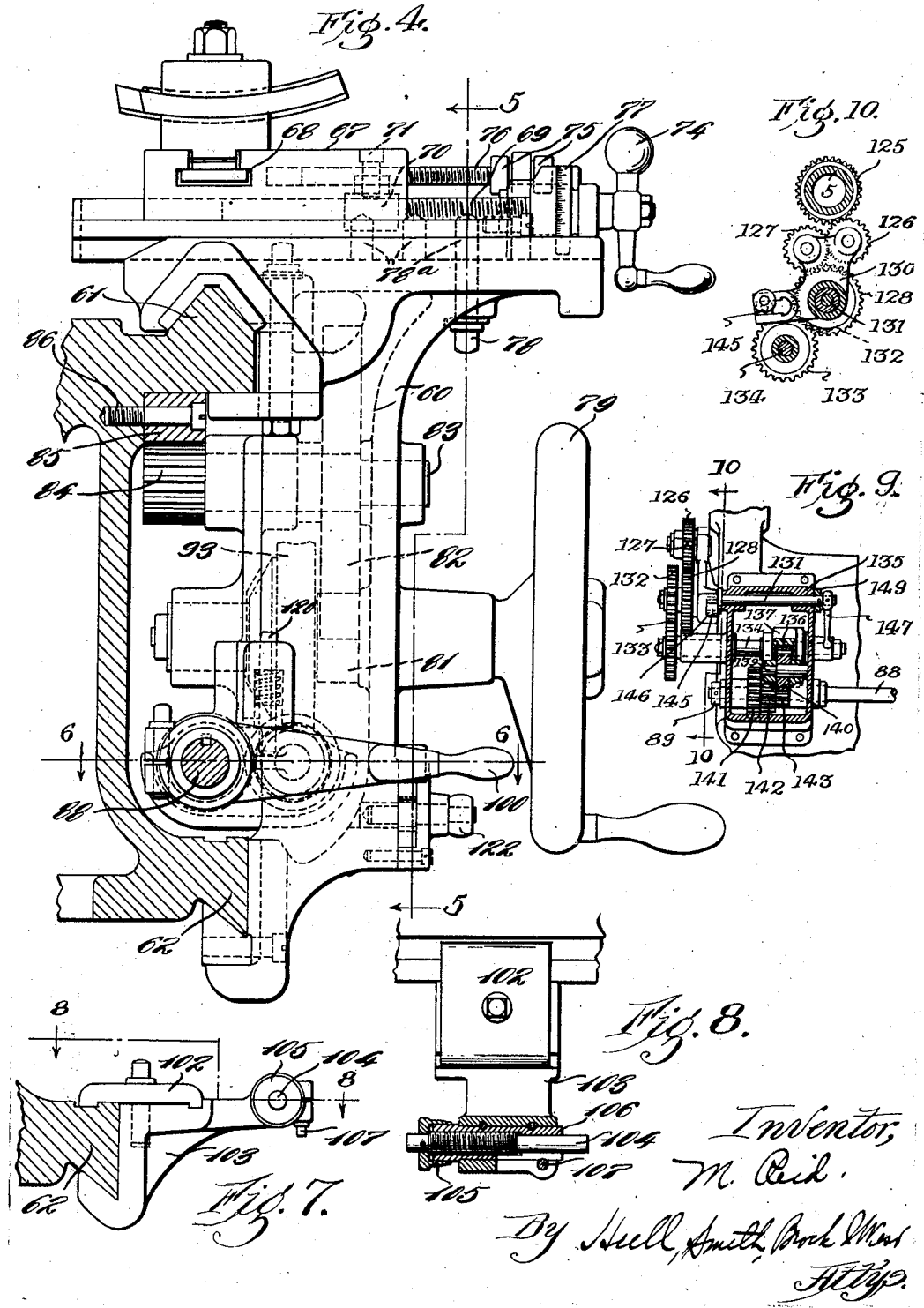
Figures 5, 6:
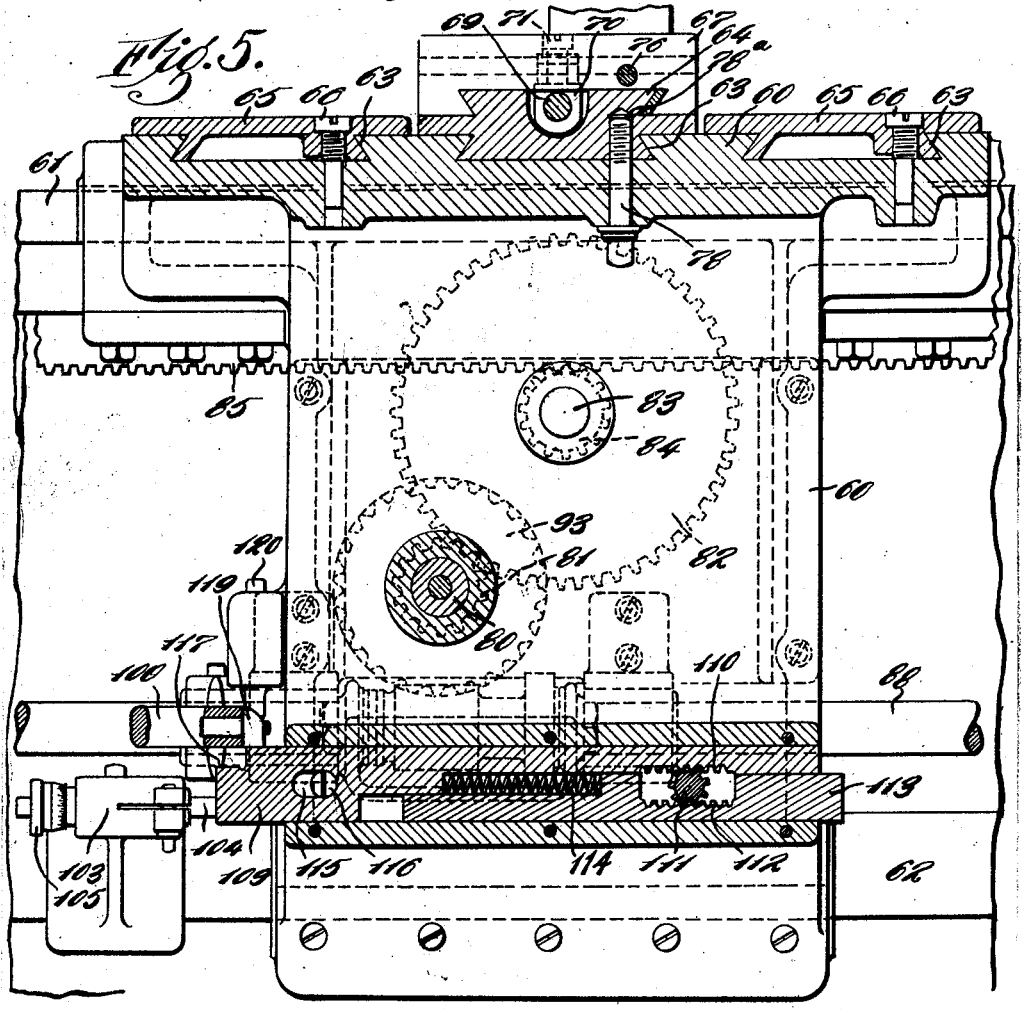

In the drawings accompanying and forming part of this application, Fig. 1 is a side elevation of a lathe showing my improved carriage mechanism applied thereto; Fig. 2 is a top plan view of the machine shown in Fig. 1 but showing the gear covers removed from certain of the gearing mechanism; Fig. 3 is a vertical sectional view taken on the line 3—3 of Fig. 2; Fig. 4 is a detail vertical sectional view taken on the line 4—4 of Fig. 1; Fig. 5 is a sectional view of the carriage taken on the line 5—5 of Fig. 4; Fig. 6 is a horizontal sectional view through the carriage taken on the line 6—6 of Fig. 4; Fig. 7 is a detail sectional view of the micrometer stop attachment taken on the line 7—7 of Fig. 1; Fig. 8 is a horizontal sectional view of the micrometer stop attachment taken on the line 8—8 of Fig. 7; Fig. 9 is a sectional view of the gear feed mechanism for driving the carriage feed mechanism; and Fig. 10 is a detail assembly of the reversing rocker arm and the reversing gear, taken on the line 10—10 of Fig. 9.

Describing the various parts by reference numerals, 1 indicates the main casting or body of the lathe which is supported by suitable legs 2, and an oil pan 3 provided with an integral oil reservoir 4 is disposed beneath the body of the lathe. A spindle 5, carrying a spindle driving gear 6, is journaled in suitable bearings 7—7 in the body of the lathe, and journaled in suitable bearings 8—8 and parallel to the spindle, is a friction clutch shaft 9. This shaft carries a spindle driving pinion 11, which meshes with gear 6, and also carries two friction clutch gears 12 and 13, on either side of a friction drive clutch 14. A countershaft 16, which is journaled in suitable bearings 17—17 and disposed parallel to the friction drive shaft, carries the gears 18 and 19, which are permanently meshed with the gears 12 and 13, respectively. The ratio of the gears 12, 13, 18 and 19 is preferably such that when the shaft 16 is rotated the spindle is driven at either of two speeds, one about 50% greater than the other, by throwing the clutch to engage gears 12 and 18 or to engage gears 13 and 19. The countershaft 16 is rotated by a gear 21 mounted on the end thereof, which is operatively connected through a gear not shown, to a drive shaft 23 that is rotated by a drive pulley 26 to which any suitable source of power may be connected. The gear 21 and the gear meshed therewith are preferably detachably connected to the shafts 16 and 23, respectively, by any suitable means as the nuts 27 threaded on the end of the shafts. This permits an interchange of gears to suit the speed desired. A detachable cover 28 serves to enclose the gear 21 and the gear meshed therewith and is fastened by any suitable means not shown. The other gears are similarly enclosed and hence need no further explanation.

Where spiral gears are used, as for the spiral driving gear 6 and the spindle driving pinion 11, there is provided a ball thrust bearing to take up the thrust of these gears, and such bearings are shown at 31 and 32 in Figs. 1, and 2.

The double friction drive clutch 14 above referred to may be of any suitable construction and is operated by means of a lever 46 which is shifted to the right to connect gear 13 with shaft 9, and to the left to connect gear 12 with shaft 9, it being understood that when one gear is connected to shaft 9, the other gear is automatically disconnected therefrom.

It will be understood that the double friction clutch shaft 9, the countershaft 16, and the drive shaft 23 are all mounted in a separate casting 48 as a complete assembly, and this casting 48 is fastened to the main casting 1 by suitable bolts, not shown, and held in alignment therewith by the cooperating surfaces 50—51 and the clutch shaft 9 fitting in bearings 8—8 which are on the main casting 1.

*Front carriage assembly.*

This assembly is shown in detail in Figs. 5 and 6 wherein 60 represents the main casting which is slidable along the front bed rail 61 and guided by the lower bed rail 62. The top of the casting is provided with a plurality of dove tailed grooves 63 to receive the double dove tail cross slides, one of which is shown at 64 while the other grooves are protected with cover plates 65 fastened in place by the screw 66. These plates can be easily removed and cross slides substituted therefor when the work demands a plurality of cutting tools. A slide block 67, provided with a suitable tool post slot 68, is slidable along the upper dove tail of the double dove tail cross slide by means of a screw 69 threaded into a nut 70 which is fastened to the cross slide by the bolt 71. A ball crank 74 fastened to the screw 69 serves to rotate it and thereby move the cross slide block longitudinally thereof and this movement is limited by the adjustable stop screw nuts 75—75 threaded on a screw 76. The cross slide screw 69 is also provided with a graduated micrometer disk 77 for measuring the movement of the cross slide block and tool post. The double dove tail cross slide 64 is also slidable along the lower dove tail with respect to the top of the main casting 60, and is positioned thereon by the bolt 78 which is passed through the main casting and threaded into any of a series of threaded holes 78ª, formed in the double dove tail slide (Fig. 4). In this manner it is possible to provide a solid support for the cross slide block when small or large objects are turned in the lathe. The carriage is movable along the bed, manually, by a hand wheel 79 which is fastened to a hollow shaft 80 the inner end of which carries a pinion 81, meshing with the gear 82 which is fastened to a countershaft 83, the inner end of which carries a pinion 84, which meshes with a rack 85 fastened to the lathe bed by the bolts 86. The carriage is automatically moved along the bed by the splined feed shaft 88 arranged longitudinally of the bed and journaled in suitable bearings 89—89. Means for rotating the shaft at variable speeds will be explained later. Referring to Fig. 6, it will be seen that a sleeve gear 90, slidable along the shaft 88, meshes with a worm sleeve gear 91 mounted on a countershaft 92. A ball thrust bearing 94 mounted on the shaft 92 takes up the end thrust from the worm. The worm engages the worm gear 93 (Fig. 3) which is loosely journaled on the hollow shaft 80. A clutch member 95 rigidly mounted on the hollow sleeve 80 is engageable with the worm gear 93 by means of the shaft 96 extending through the hollow sleeve 80 and threaded into the clutch member 95. A knob 97 is provided on the outer end of the shaft for actuating it, thereby disengaging the clutch. The sleeve gear 90, the shaft 92, and the worm sleeve gear 91 are mounted in a cradle 99 provided with a handle 100, (Fig. 6) and swingable about the feed shaft 88 as an axis so that when the cradle is lowered the worm is disengaged from the worm gear 93 which stops the carriage.

A micrometer stop attachment is provided for automatically dropping the cradle and consists of a clamping member 102 (Figs. 7 and 8) for clamping the micrometer bracket 103 to the lower bed rail 62. A micrometer spindle 104 carrying the micrometer index sleeve 105 is threaded into a sleeve 106 which is clamped to the bracket by the screw 107. The micrometer spindle extends on both sides of the bracket so that it may engage the carriage when mounted on either side thereof. As shown in Figs. 5 and 6 the bracket is clamped on the left hand side of the carriage and when so positioned, the spindle engages the upper release bar 109 which is slidably mounted in the carriage and pushes it to the right. This bar is provided with a rack portion 110 which engages pinion 111 which meshes also with the rack portion 112 in the lower release bar 113. The releasing bars 109 and 113 are held in operative position by a spring 114 which tends to force them apart, and bar 109 is provided with a slot 115 and a bolt 116 for limiting the outward movement of the bar and also provided with a notch 117 at the outer end thereof. This notch is adapted to receive the hardened stud 119 which is mounted in the lever 100 and held against the bar 109 by a spring pressed pin 120 bearing on a flanged projection 100ª of the lever 100. In operation the carriage moves to the left and bar 109 engages the micrometer spindle 104 which has been set to a previously determined position, and the bar 109 is forced to the right which also serves to move the bar 113 to the left through the medium of pinion 111. The stud 119 drops into notch 117 by the aid of the spring pressed pin 120 and thereby lowers lever 100 which lowers the cradle 99 and disengages the worm from the worm gear 93 which stops the carriage. It will be readily apparent that if the micrometer stop is placed on the right hand side of the carriage, and the carriage is moving to the right, the bar 113 would engage the micrometer spindle 104 and its motion transmitted to the bar 109 and thereby serve to stop the carriage in the same manner. An emergency stop is provided by means of a lever 122 which is fastened to the pinion shaft 123 and by rotating this lever by hand the releasing bars can be contracted and the cradle dropped.

*Front carriage feed mechanism.*

The gearing for driving the carriage feed shaft 88 is best shown in Figs. 1, 2, 9 and 10. The spindle 5 is provided at one end with a gear 125 which meshes with a gear 126 which in turn meshes with a similar gear 127 and this gear meshes with a larger gear 128. The three gears 126, 127 and 128 are journaled on stud shafts mounted on the bracket 130 which is swingable about the shaft 131 as an axis so as to engage either of gears 126 or 127 with the gear 125, thereby serving to reverse the direction of rotation of gear 128 and subsequently shaft 88. The stud shaft carrying gear 128 also mounts a gear 132 which rotates simultaneously therewith and meshes with a gear 133 mounted on a countershaft 134 journaled in suitable bearings, in the change gear box 135. The shaft 134 is splined and mounts a slide pinion 136 movable by the index arm 137 which is journaled on the shaft 134 and swingable thereabout as an axis. The index arm mounts a stud shaft 139 on which is journaled gear 140 which meshes with pinion 136 and one of the variable speed gears, 141, 142, 143, rigidly mounted on the feed shaft 88. The shaft 131 is journaled in suitable bearings in the gear box 135 and at one end carries a block 145 slidable in the channel 146 to the bracket 130, and at the other end carries a short lever 147 so that by swinging the lever through 180°, it causes a corresponding movement of block 147 and this swings the bracket 130 to engage either of the gears 126 or 127 with gear 125, thereby reversing the carriage as previously explained. In order to hold the shaft 131 in a fixed position, there is provided a boss 149 and a spring pressed pin 150 (Fig. 33) adapted to engage either of two holes not shown in the boss.

Having thus described my invention, what I claim is:—

1. A stop attachment for a lathe carriage comprising a pair of releasing bars slidably mounted on said carriage, a lever supported by one of said releasing bars whereby the carriage feed mechanism is normally held in operative position and means for moving said lever to disengage said feed mechanism and stop said carriage.

2. A stop attachment for a lathe carriage comprising a pair of releasing bars slidably mounted on said carriage, means connecting said bars whereby motion of one is transmitted to the other, a lever engaging one of said bars to hold the carriage feed mechanism in operative position and an adjustable abutment on the lathe body adapted to engage either of said releasing bars to move said lever and said feed mechanism to an inoperative position.

3. A stop attachment for a lathe carriage comprising a bar mounted on the carriage and adapted to engage an abutment, said bar being slidable in a direction opposite to the movement of said carriage, feed mechanism for moving said carriage and bar into engagement with said abutment, a connection between said feed mechanism and said bar for operatively engaging said feed mechanism with said carriage, and means associated with said connection for disengaging said feed mechanism from said carriage upon engagement of said bar with said abutment to move said bar in a direction opposite to the direction of travel of said carriage.

4. A stop attachment for a lathe carriage comprising a pair of members slidably mounted for movement in opposite directions on the carriage, a feed mechanism normally retained in operative position by a projection engaging one of said members, and means adapted to contact with either of said members at a predetermined point to slide one of said members with respect to the carriage and release said feed mechanism.

5. A stop attachment for a lathe carriage comprising a pair of members slidably mounted on the carriage, means connecting said members whereby motion of one is transmitted to the other, a feed mechanism, means connected with said feed mechanism and engaged with one of said members for retaining said mechanism in operative position, and means adapted to contact with either of said members at a predetermined point to release said feed mechanism.

6. A stop attachment for a lathe carriage comprising a pair of bars slidably mounted on the carriage, a spring normally urging said bars apart, a connection between said bars whereby motion of one is transmitted in an opposite direction to the other, a feed mechanism for said carriage, a projection extending from said feed mechanism and engaged with one of said bars for retaining said mechanism in operative position, and means adapted to contact with either of said bars to release said feed mechanism.

7. A stop attachment for a lathe carriage comprising a pair of bars slidably mounted on the carriage, a spring normally urging said bars apart, means operatively connecting each of said bars whereby motion of one is transmitted to the other, a feed mechanism for said carriage including a cradle movable about an axis, a driving element journalled in said cradle and adapted to engage with a driving element for said carriage, a projection extending from said cradle and adapted to engage with one of said bars to retain said driving elements in operative connection, and means adapted to engage with either of said bars to release said cradle and break said driving connection.

8. A stop attachment for a lathe carriage comprising a pair of bars slidably mounted on the carriage, a spring normally urging said bars apart, a pinion engaged with each of said bars whereby motion of one bar is transmitted to the other bar in an opposite direction, a feed mechanism for said carriage, a projection extending from said feed mechanism and engaged with one of said bars for retaining said mechanism in operative position, means adapted to contact with either of said bars to release said feed mechanism, and manually controlled means for rotating said pinion thereby to release said feed mechanism.

9. A stop attachment for a lathe carriage comprising a releasing bar slidably mounted on said carriage, feed mechanism for operating said carriage, an element supported by said releasing bar whereby the carriage feed mechanism is normally held in operative position to drive said carriage, and means for moving said element to disengage said feed mechanism and stop said carriage.

In testimony whereof, I hereunto affix my signature.

MARCELLUS REID.